United States Patent
Dehn et al.

(10) Patent No.: US 8,146,860 B2
(45) Date of Patent: Apr. 3, 2012

(54) AIRCRAFT FUSELAGE WITH CIRCULAR-ARC-SHAPED EXTERIOR CONTOUR

(75) Inventors: Martin Dehn, Wentorf (DE); Ingo Wuggetzer, Woerthsee (DE); Ugur Ipek, Buxtehude (DE); Christoph Muehlich, Berlin (DE)

(73) Assignee: Airbus Operations GmbH (DE)

( * ) Notice: Subject to any disclaimer, the term of this patent is extended or adjusted under 35 U.S.C. 154(b) by 446 days.

(21) Appl. No.: 12/226,230

(22) PCT Filed: Apr. 5, 2007

(86) PCT No.: PCT/EP2007/003129
§ 371 (c)(1),
(2), (4) Date: May 11, 2009

(87) PCT Pub. No.: WO2007/115804
PCT Pub. Date: Oct. 18, 2007

(65) Prior Publication Data
US 2009/0321568 A1   Dec. 31, 2009

Related U.S. Application Data

(60) Provisional application No. 60/790,691, filed on Apr. 10, 2006.

(30) Foreign Application Priority Data

Apr. 10, 2006   (DE) .................. 10 2006 016 756

(51) Int. Cl.
*B64C 1/00* (2006.01)

(52) U.S. Cl. ........................ 244/119; 244/120

(58) Field of Classification Search .............. 244/119, 244/120
See application file for complete search history.

(56) References Cited

U.S. PATENT DOCUMENTS

| | | | | |
|---|---|---|---|---|
| 1,349,526 | A * | 8/1920 | Niedbala | 52/249 |
| 3,519,224 | A | 7/1970 | Boyd | |
| 5,398,889 | A * | 3/1995 | White et al. | 244/119 |
| 6,705,567 | B2 | 3/2004 | Dong et al. | |
| 2002/0096598 | A1 | 7/2002 | Nelson | |
| 2003/0213870 | A1* | 11/2003 | Eakins et al. | 244/119 |
| 2004/0245375 | A1* | 12/2004 | Adamson et al. | 244/15 |

FOREIGN PATENT DOCUMENTS

| | | |
|---|---|---|
| DE | 19810687 | 9/1999 |
| DE | 60303996 T2 | 9/2006 |
| EP | 1413 513 | 4/2004 |
| EP | 1407963 | 4/2004 |
| GB | 1327587 | 8/1973 |
| RU | 37688 U1 | 5/2004 |
| WO | 9748600 | 12/1997 |

OTHER PUBLICATIONS

International Search Report, PCT/EP2007/003129.

* cited by examiner

*Primary Examiner* — Timothy D Collins
*Assistant Examiner* — Nicholas McFall
(74) *Attorney, Agent, or Firm* — Lerner, David, Littenberg, Krumholz & Mentlik, LLP (57) ABSTRACT

A fuselage section comprises an interior that forms a passenger cabin. In horizontal projection the fuselage section is geometrically defined by a first exterior skin region and a second exterior skin region, wherein the second exterior skin region faces the first exterior skin region. Both the first exterior skin region and the second exterior skin region in longitudinal direction of the passenger cabin comprise in horizontal projection a circular-arc-shaped contour of uniform radius of curvature.

14 Claims, 12 Drawing Sheets

AIRCRAFT FUSELAGE WITH CIRCULAR-ARC-SHAPED EXTERIOR CONTOUR

RELATED APPLICATIONS

This application is a U.S. national stage entry of Patent Cooperation Treaty Patent Application No. PCT/EP2007/003129 filed Apr. 5, 2007, which claims the benefit of the filing date of U.S. Provisional Patent Application No. 60/790,691 filed Apr. 10, 2006, and of the German Patent Application No. 10 2006 016 756.2 filed Apr. 10, 2006, the disclosures of which are hereby incorporated herein by reference.

TECHNICAL FIELD

The present invention generally relates to a new construction principle for a fuselage. In particular the invention relates to a fuselage section with a specially selected contour. Furthermore, the invention relates to an interior lining for lining an aircraft passenger cabin, wherein the shape of the interior lining is such as to make it possible to line the fuselage section according to the invention in the region of the passenger cabin. Lastly, the invention relates to a fuselage with at least one fuselage section according to the invention.

BACKGROUND TO THE INVENTION

Generally speaking the fuselage of a large-volume passenger aircraft comprises several sections whose cross-sectional shape does not change in longitudinal direction of the fuselage in the region of the passenger cabin. The cross-sectional geometry of the fuselage changes only in the region of the nose and of the rear of the aircraft in that the fuselage increasingly tapers off in these places. In these transitional regions it is thus necessary to provide (conically) tapering-off fuselage sections in order to impart the desired shape to the fuselage.

While so far provisions have been made so that interior lining components can be installed in the region of the fuselage with constant fuselage cross section both on the right-hand external skin and on the left-hand external skin, this ability to exchange interior lining components, however, only relates to interior lining components for lining the fuselage region whose cross section remains the same. In contrast to the above, in the (conically) tapering-off fuselage regions exchanging interior lining components between the right-hand side and the left-hand side is not possible, and consequently in relation to these conical regions special interior lining components have to be designed, dimensioned, produced and provided both for the right-hand exterior skin region and for the left-hand exterior skin region; a situation which ultimately in an undesirable manner has a negative influence on production costs.

PRESENTATION OF THE INVENTION

Starting from a lack of exchangeability of inner lining components, as described above, between the right-hand and the left-hand exterior skin, it is, among other things, an object of the present invention to state an implementation that makes for improved exchangeability of interior lining components between the right-hand exterior skin region and the left-hand exterior skin region of a large-volume passenger aircraft.

The object of the invention is met by a specially designed aircraft fuselage section with a specially designed interior lining, as well as by a specially designed fuselage with the characteristics according to the independent claims. Below, embodiments of the fuselage section according to the invention are described, wherein these embodiments correspondingly also apply to the interior lining according to the invention, as well as to the fuselage according to the invention.

As already stated, the object on which the invention is based is met by a specially designed fuselage section. This fuselage section comprises an interior that forms a passenger cabin. When viewed in horizontal projection, the fuselage section according to the invention is geometrically defined by a first exterior skin region and a second exterior skin region, wherein the second exterior skin region faces the first exterior skin region. In a manner according to the invention, when viewed in horizontal projection, both the first exterior skin region and the second exterior skin region in longitudinal direction of the passenger cabin comprise a circular-arc-shaped contour of uniform radius of curvature.

As a result of the circular arc-shaped contour of the two facing exterior skin regions the ability to exchange interior lining components between the right-hand side and the left-hand side can be ensured in the desired manner. In particular, the circular-arc-shaped contour design, according to the invention, of the exterior skin regions can ensure that interior lining components of only one single type have to be designed, produced and provided, because due to the curved shape of the exterior skin regions one and the same interior lining component can be installed at any desired position in longitudinal direction of the passenger cabin.

Apart from the exchangeability of the interior lining components, according to the invention, the circular-arc-shaped design of the exterior skin regions further obviates the need to provide additional tapering fuselage sections in the nose region and the rear region because due to the circular-arc-shaped contour of the exterior skin regions the entire fuselage is widened towards the centre, whereas towards the front and the rear it tapers off in the desired manner so that no additional tapering-off conical fuselage sections have to be provided.

As a result of the design, according to the invention, of the fuselage section with circular-arc-shaped exterior skin regions, furthermore a positive effect can be achieved in that the entire centre region of the fuselage is wider than its nose region or rear region. This widening of the fuselage towards the centre can be used to optimise the time required for boarding, in that the aircraft door to provide access to the aircraft is placed in the wide central region of the fuselage so that, during boarding, the stream of passengers can branch into two directions, namely towards the front and towards the rear. Due to the tapered shape in the direction of the nose region and the rear region, the aisle, which extends in longitudinal direction, tapers accordingly between the individual seat rows, which in an advantageous manner results in the aisle width being wider in the centre section of the fuselage, where the number of passengers during boarding is largest, whereas in the end regions of the fuselage the aisle width is comparatively narrow, which however, due to the smaller number of passengers in that region during boarding, is of no great consequence. As a result of the circular-arc-shaped contour design of the exterior skin regions that face each other it is thus possible, in a natural manner, to optimally use the space required in the aisle region for the purpose of boarding.

As already mentioned, the entire exterior skin region of one side can in a corresponding manner also be used as the exterior skin region of the other side of the fuselage, so that a good overall ability to exchange the exterior skin regions is provided.

However, to ensure economical production of the fuselage section, each of the two exterior skin regions can comprise a multitude of exterior skin segments which in horizontal projection comprise a circular-arc-shaped exterior contour, wherein the exterior contour of the exterior skin segments coincides with the contour of the fuselage section. In other words only a single type of exterior skin segment has to be provided to produce from it the fuselage section according to the invention. To this effect several identical exterior skin segments are lined up side-by-side to produce an exterior skin region of the fuselage section. In horizontal projection this results in a segment of a circle that in horizontal projection represents one of the two facing exterior skin regions so that a fuselage that has been produced with the use of the above-mentioned exterior skin segments is wider in the centre when compared to the ends.

Since the facing exterior skin regions are of a symmetrical design in relation to a centre line in longitudinal direction of the fuselage section, this one type of exterior skin segment can correspondingly also be used to form the other exterior skin region so that merely a multitude of exterior skin segments of only one type has to be designed, produced and provided in order to build, from it, a fuselage section or an entire fuselage.

In contrast to the arrangement in a conventional fuselage, the facing exterior skin regions thus do not extend parallel in relation to each other, but instead are curved relative to each other so that in horizontal projection the fuselage section can, for example, comprise a biconvex shape in some sections at least. In the case of a biconvex shape of the fuselage section, starting from the fuselage or nose region, the passenger cabin widens towards the centre so that the fuselage section is widest in a central region.

As an alternative to the biconvex shape it is, of course, also possible to curve the two facing exterior skin regions such that in horizontal projection the fuselage section comprises a biconcave shape, at least in some regions. Such a design of the exterior skin region makes good sense in particular due to the laws of aerodynamics applicable in high-speed conditions for high-speed aircraft. In the case of a biconcave design of the fuselage section, the fuselage, starting from its nose region or rear region, tapers off towards the centre so that in the centre region the fuselage is narrowest. As has already been mentioned, such a biconcave design is advantageous in particular in the case of high-speed aircraft because the laws of aerodynamics are practically reversed in particular in the high-speed range.

Due to the limited space available in aircraft, the aircraft section according to the invention not only comprises the two exterior skin regions but also an interior lining which lines at least one of the two facing exterior skin regions in a manner in which the interior lining essentially follows the curvature of the respective exterior skin region. Thus, in horizontal projection, in longitudinal direction of the aircraft the interior lining comprises a circular arc shape of uniform curvature, wherein the curvature corresponds to the curvature of the respective exterior skin region. In this document the term "circular-arc-shaped interior lining" refers to the global shape of the interior lining, which when viewed globally has such a shape that it essentially follows the curvature of the exterior skin region to be lined. This design with an interior lining of circular arc shape can ensure that the interior lining in a space-saving manner hugs the corresponding exterior skin regions so that there are no wide openings between the interior lining and the exterior skin region, which wide openings would otherwise be lost as useable space.

In order to be able to also design the interior lining in a modular manner, analogous to the design of the exterior skin regions, so that only a small number of different interior lining components have to be provided, according to a further aspect of the present invention it is proposed to compose the interior lining from a multitude of interior lining segments, wherein in horizontal projection each individual interior lining segment is of circular arc shape. In this arrangement the curvature of the interior lining segments corresponds to the curvature of the contour of the fuselage section so that the interior lining segments, aligned side-by-side, provide the above-mentioned interior lining, while the individual interior lining segments hug the circular-arc-shaped contour of the exterior skin regions from the inside in the desired manner.

The interior lining segments can, for example, be components from the group comprising lateral lining, base lining, illumination strip, service panel lining, ceiling lining and hatracks. The interior lining segments are thus any parts of the interior lining between the floor and the ceiling region in the passenger cabin.

By means of the segmented design of the interior lining it can be ensured that one and the same interior lining segment can be used at any desired position for lining the exterior skin regions of the fuselage section. To this effect the interior lining segments are designed such that one and the same interior lining segment can be used alternatively for lining the first exterior skin region or the second exterior skin region.

By means of the shape, according to the invention, of the fuselage section with a circular-arc-shaped contour, furthermore a situation can be achieved wherein only a single type of stringer needs to be designed, produced and provided, because the design of the stringer can also be matched to the circular-arc-shaped contour of the exterior skin regions. Thus, according to a further aspect of the present invention, the fuselage comprises a multitude of stringers which in horizontal projection are shaped in the manner of a circular arc, wherein the curvature of the stringers is uniform, which curvature corresponds to the curvature of the contour of the exterior skin regions.

According to yet another aspect of the present invention, the fuselage section according to the invention further comprises a multitude of lateral fuselage frames of identical dimensions, which lateral fuselage frames in horizontal projection are arranged such that they point in the direction of a common centre of a circle. Because of the design, according to the invention, of the fuselage section with a circular-arc-shaped contour, it is sufficient to design, produce and provide a single type of lateral fuselage frame, which can then be arranged along the longitudinal extension of the fuselage section in the manner mentioned. There is thus no need for any special lateral fuselage frames as become necessary in conventional fuselages in the region of the (conically) tapering-off fuselage sections.

According to a further aspect of the present invention, an interior lining for lining an aircraft passenger cabin is proposed, which lining in horizontal projection is geometrically defined by a first interior lining region and a second interior lining region that faces said first interior lining region. In this arrangement, in horizontal projection, in longitudinal direction of the aircraft passenger cabin the two interior lining regions comprise a circular arc shape of uniform curvature.

Due to the fact that in longitudinal direction of the aircraft passenger cabin the two interior lining regions comprise a circular arc shape, the interior lining according to the invention can be precisely fitted into a fuselage section according to the invention, which results from this fuselage section, corresponding to the circular arc shape of the interior lining regions, also comprising exterior skin regions of a circular-arc-shaped contour, wherein the two circular arc shapes of the interior lining and of the exterior skin region correspondingly match each other.

Due to the fact that the interior lining regions comprise a circular arc shape of uniform curvature, the interior lining regions can be made up from a multitude of interior lining segments which in horizontal projection comprise a circular-arc-shaped contour, wherein the curvature of the interior lining segments corresponds to the curvature of the shape of the interior lining regions. It may thus be sufficient to design, produce and provide only a single type of interior lining segment, which segments can then be lined up side-by-side so as in their totality to form an entire interior lining region.

According to one embodiment the two facing interior lining regions can be curved such that the aircraft passenger cabin in horizontal projection is of biconvex shape at least in some regions, as has already been described above with reference to the fuselage section according to the invention. In this case the interior lining can be fitted in a space-saving manner to a fuselage section that is also biconvex in shape.

However, in cases where the interior lining is to be fitted to a biconcave curved fuselage section, the two facing interior lining regions can be curved such that the aircraft passenger cabin in horizontal projection comprises a biconcave shape, at least in some regions, as a result of which, again, space-saving installation of the interior lining can be ensured.

The interior lining segments can, for example, be components from the group comprising lateral lining, base lining, illumination strip, service panel lining, ceiling lining or hatracks so that almost the entire interior lining of a passenger cabin can be composed from circular-arc-shaped components of just one type.

As is evident from the above explanations, the interior lining segments due to their circular-arc-shaped contour are designed to be used alternatively for lining a left-hand exterior skin region or a right-hand exterior skin region of an aircraft. It is thus not necessary to provide different interior lining segments for the right-hand exterior skin and for the left-hand exterior skin, so that the production costs can be considerably reduced.

According to yet another exemplary embodiment of the present invention, a fuselage is proposed which at least in some regions is formed by at least one fuselage section as described above. In this arrangement, all the above explanations correspondingly also apply in relation to the fuselage according to the invention.

According to a particular embodiment of the fuselage according to the invention, said fuselage comprises two fuselage sections as described above, which in longitudinal direction of the fuselage are arranged so as to be offset in relation to each other and are connected to each other by a straight-line fuselage section. Thus, for example, two biconcave fuselage sections can be interconnected by a straight-line fuselage section, as a result of which the fuselage can be extended in a simple manner. In this arrangement the straight-line fuselage section is fitted, in a central region of the fuselage, between the two biconcave fuselage sections so that the widest region of the fuselage is expanded or lengthened.

BRIEF DESCRIPTION OF THE DRAWINGS

Below, the invention is explained in an exemplary manner with reference to the enclosed drawings. At this stage it should be noted that the exemplary embodiments explain the invention merely by way of examples, and are in particular not to be interpreted as limiting the scope of protection in any way. The following are shown:

FIGS. 13 and 14 explain the design of fuselages of different size, each with the same fuselage- and nose section, with conical intermediate sections being installed in between.

Throughout all the figures identical or corresponding elements have the same reference characters.

DESCRIPTION OF EXEMPLARY EMBODIMENTS OF THE INVENTION

Figure 1:
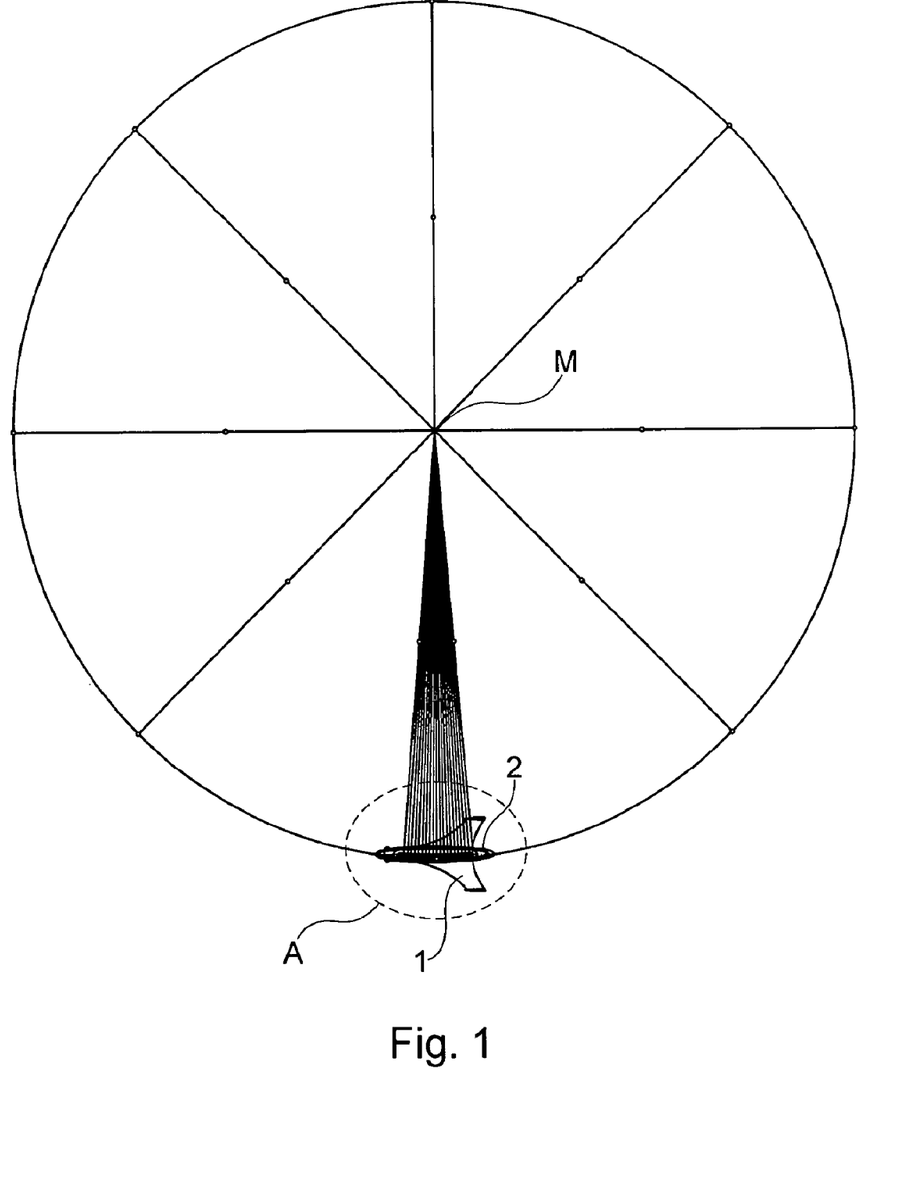
FIG. 1 shows the design and construction principle on which the invention is based.
Figure 2:
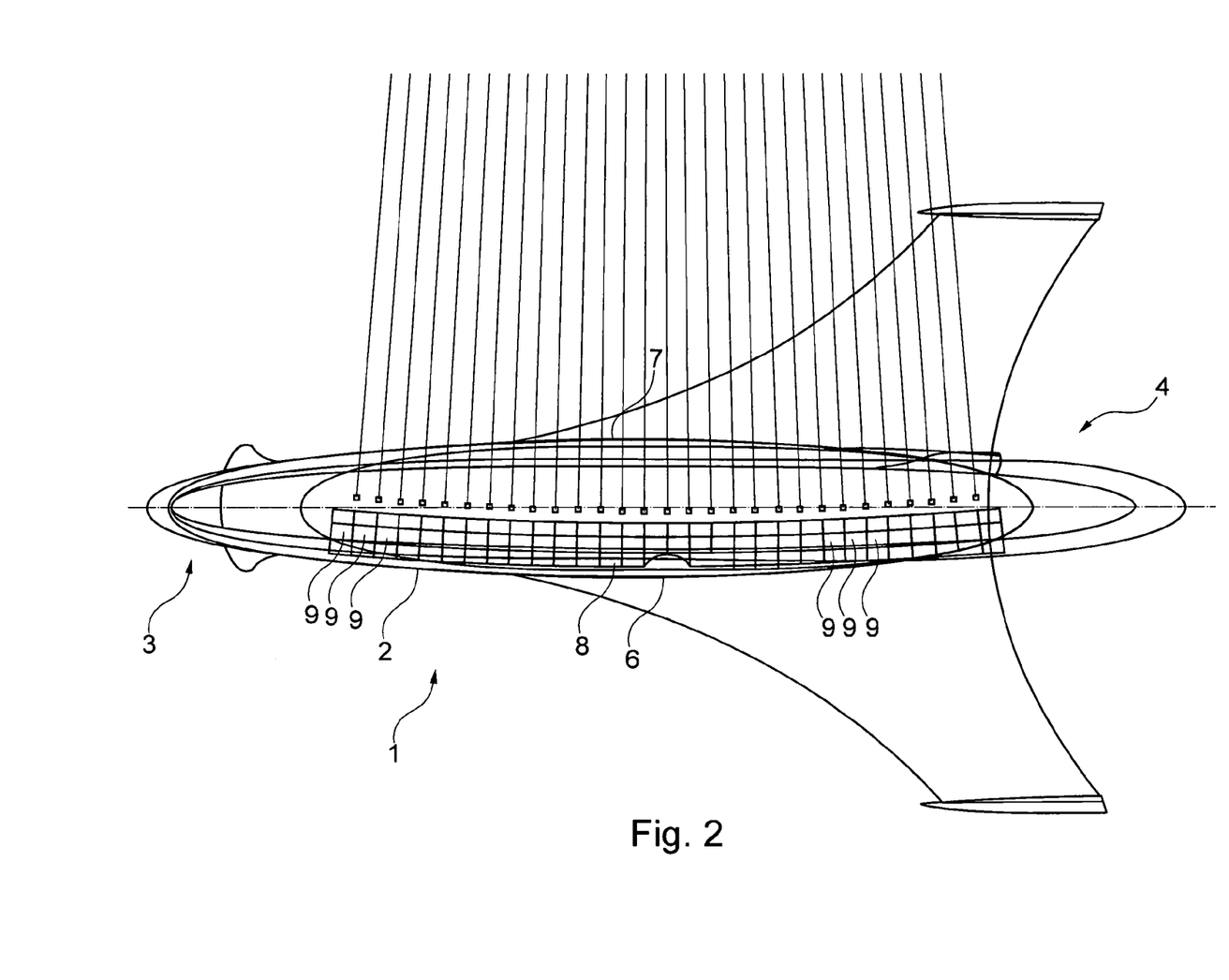
FIG. 2 shows an enlarged view of section A of FIG. 1.

First, with reference to FIGS. 1 and 2 the design and construction principle on which the invention is based is to be explained. FIG. 1 shows an aircraft 1 which in FIG. 2 is shown in an enlarged horizontal projection. The aircraft 1 essentially comprises a fuselage 2 which at its front end is delimited by a nose region 3 and at its rear by a rear region 4. As shown in FIG. 2, the fuselage 2 is of biconcave shape with two exterior skin regions 6, 7 that face each other, which exterior skin regions 6, 7 in longitudinal direction of the fuselage 2 comprise a circular-arc-shaped convex contour of uniform curvature. In FIGS. 2 and 1 the circular arc shape of the first exterior skin region 6 is shown by a multitude of radial rays that all intersect in a common centre M of a circle on which the circular-arc-shaped contour of the first exterior skin region 6 is situated, as is clearly shown in FIGS. 1 and 2. The horizontal projection of FIG. 2 further shows an interior lining 8 which lines the left-hand exterior skin 6 of the fuselage 2 towards the inside. As is shown in FIG. 2, the interior lining 8, too, in longitudinal direction of the fuselage 2 and in horizontal projection is circular-arc-shaped with a uniform curvature that essentially corresponds to the curvature of the exterior skin 6.

As is further shown in FIG. 2, the interior lining 8 comprises a multitude of interior lining segments 9 which in horizontal projection are also in the shape of a circular arc in each section, wherein the radii of curvature correspond to the radii of curvature of the interior lining 8. In this arrangement the interior lining segments 9 are lined up side-by-side, thus overall forming the interior lining 8. While FIG. 2 only shows ceiling lining parts 10 and lateral lining parts 11 of the interior lining segments, the hatracks, illumination strips, service panel linings and the lateral base lining of the lateral lining are also designed in a corresponding manner in the shape of interior lining elements 11 of circular-arc-shaped contour.

Figure 3A:
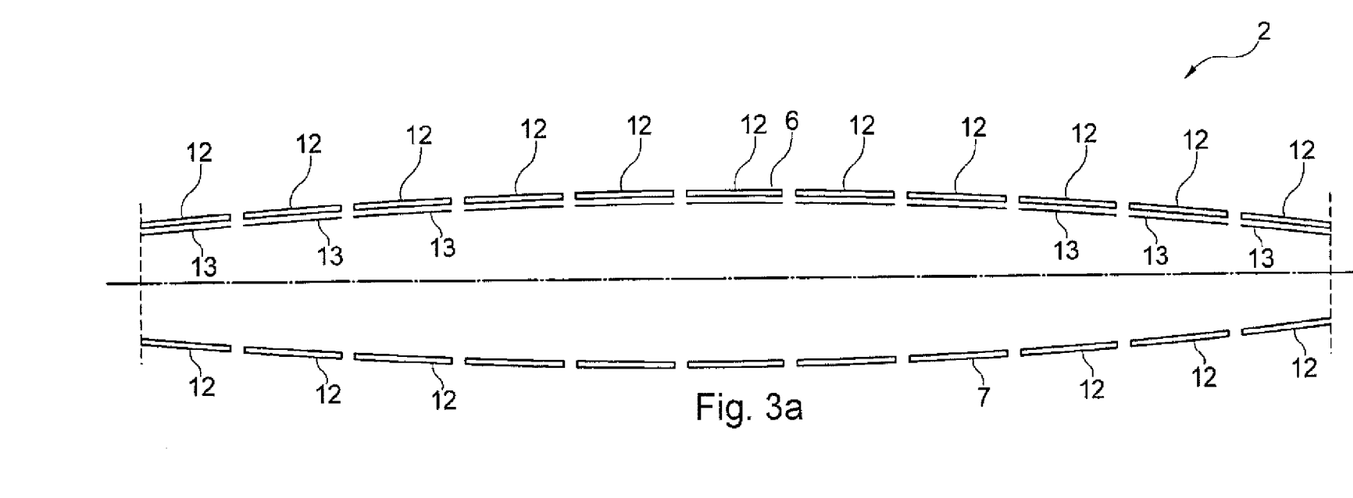
FIGS. 3A and 3B explain the design advantage that can be achieved with the invention (FIG. 3A) when compared to a conventional fuselage (FIG. 3B)
Figure 3B:
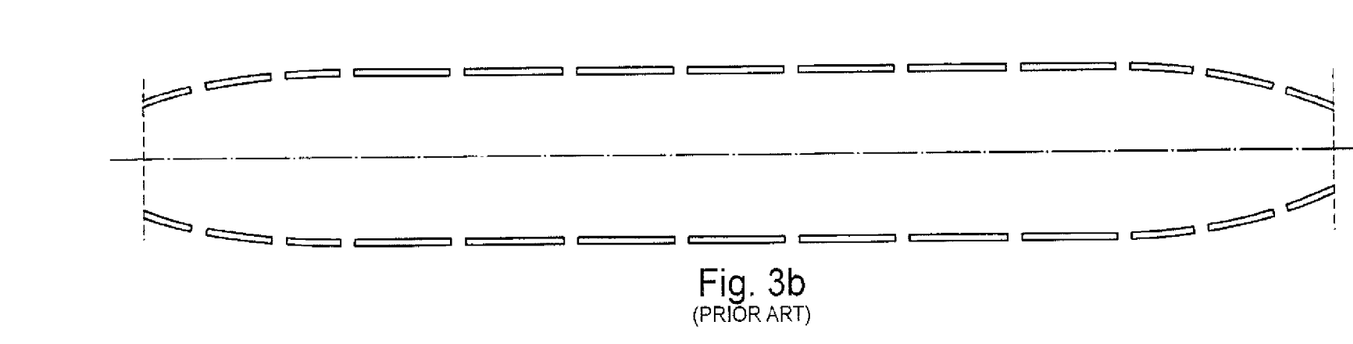

FIG. 3A-3B explain the construction advantages of a fuselage design according to the invention when compared to a conventional fuselage. As shown in FIG. 3B, which shows a conventional fuselage, said fuselage comprises seven linear fuselage sections of the same type, to which at the rear end and at the nose end three special tapering conical fuselage sections are connected, which fuselage sections have to be of a special design. In this arrangement the special design of these tapering fuselage sections not only relates to the external skin but also to the interior lining components.

In contrast to the above, the fuselage according to the invention, as shown in FIG. 3A, comprises a multitude of identical exterior skin segments 12, wherein for the entire fuselage 2 a single type of exterior skin segment 12 is adequate. These identical exterior skin segments 12 are lined up side-by-side so as to produce overall a uniform exterior skin region 6 or a facing exterior skin region 7. It should be emphasized that due to the circular arc shape of the exterior skin segments 12, identical exterior skin segments 12 can be used both for the left-hand exterior skin region 6 and for the right-hand exterior skin region 7.

FIG. 3A, furthermore, the circular-arc-shaped interior lining segments 13 are shown, wherein again only a single type of interior lining component is required to form the basis of the entire interior lining 8, to which purpose the individual interior lining segments 13 are lined up side-by-side as shown in FIG. 3A.

Figure 4:
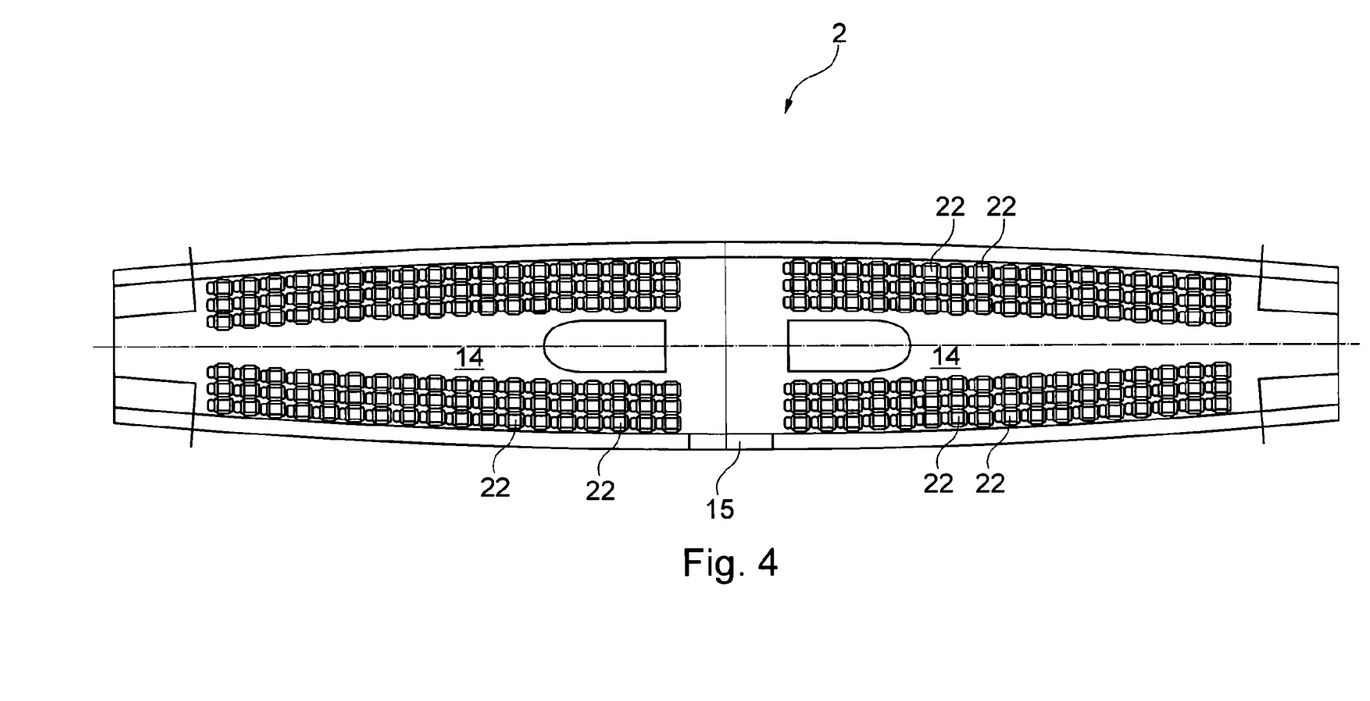
FIG. 4 shows a horizontal projection of the fuselage according to the invention with the varying width of the aisle being evident.

FIG. 4 shows a view from above into a passenger cabin in the interior of the fuselage 2 according to the invention. Due to the biconvex design of the fuselage the fuselage 2 widens towards the centre, whereas it tapers off towards the rear region and the nose region. Arranged in the passenger cabin is a multitude of seat rows 22, each comprising three seats that are separated from each other by an aisle 14 extending in longitudinal direction of the fuselage 2. Due to the fact that each seat row 22 comprises three seats, which furthermore are equally spaced apart from each other in each seat row, as a result of the fuselage design according to the invention the aisle 14 widens with a biconvex shape towards the centre region of the fuselage 2, whereas the aisle 14 tapers off in the direction of the nose region and the rear region. This shape of the aisle 14, which shape tapers off towards the ends of the fuselage, can be used to advantage for optimal boarding in that the boarding door 15 which provides access to the passenger cabin is provided in the central region of the fuselage 2, so that during boarding the stream of passengers first reaches the wide region of the aisle 14. The fact that the aisle 14 is wider in the central region is advantageous in particular in that in particular in the central region of the fuselage 2 the number of passengers who are boarding is particularly large because passengers with a seat in the central region and passengers with a seat in the end regions enter through the door 15 and proceed to the wide central aisle region. However, during boarding, the number of passengers continuously decreases towards the ends of the fuselage along the aisle 14 so that despite the tapering-off aisle width there is still enough space for collision-free boarding.

Figure 5:
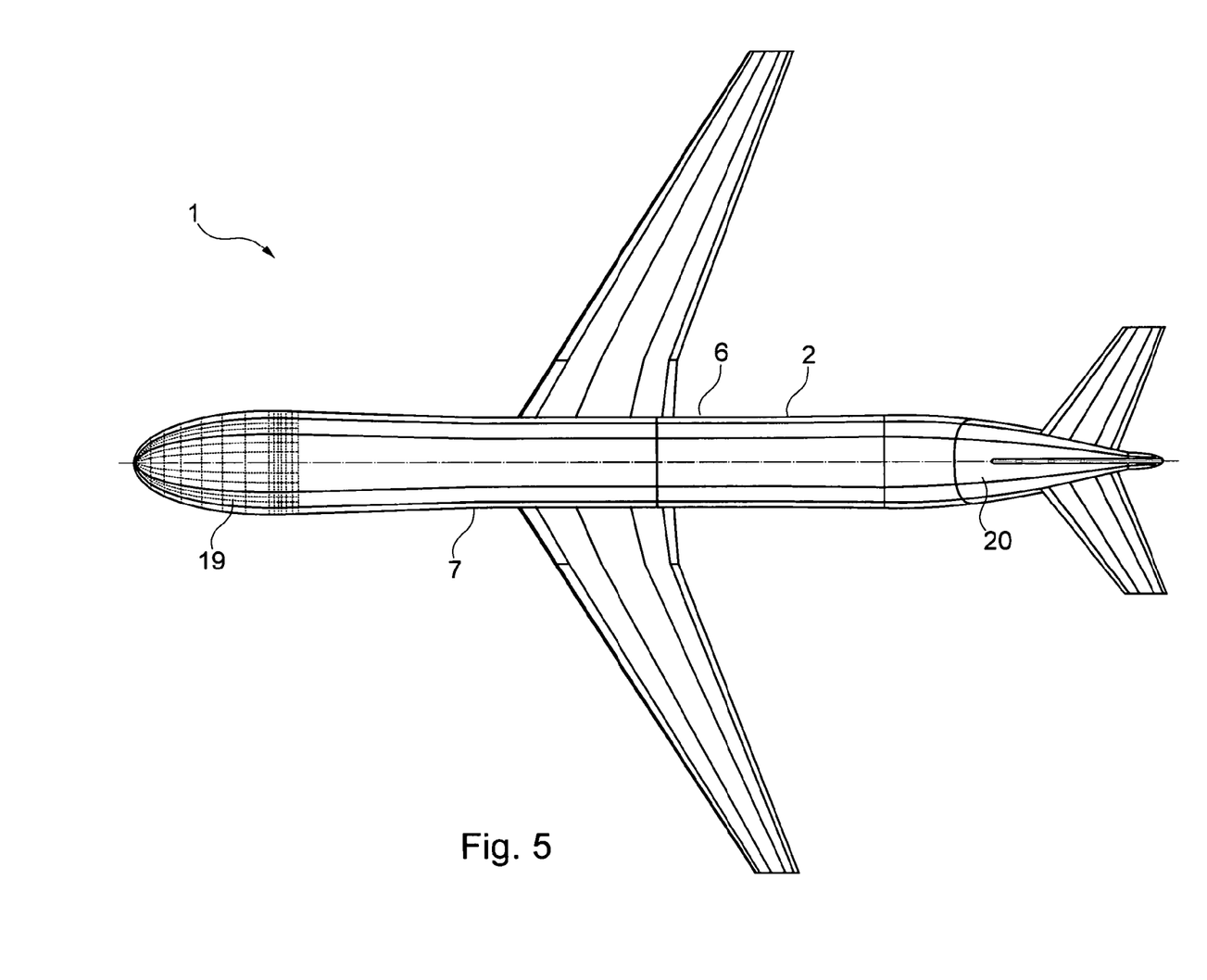
FIG. 5 shows a horizontal projection of an aircraft with a fuselage of biconcave shape.
Figure 6:
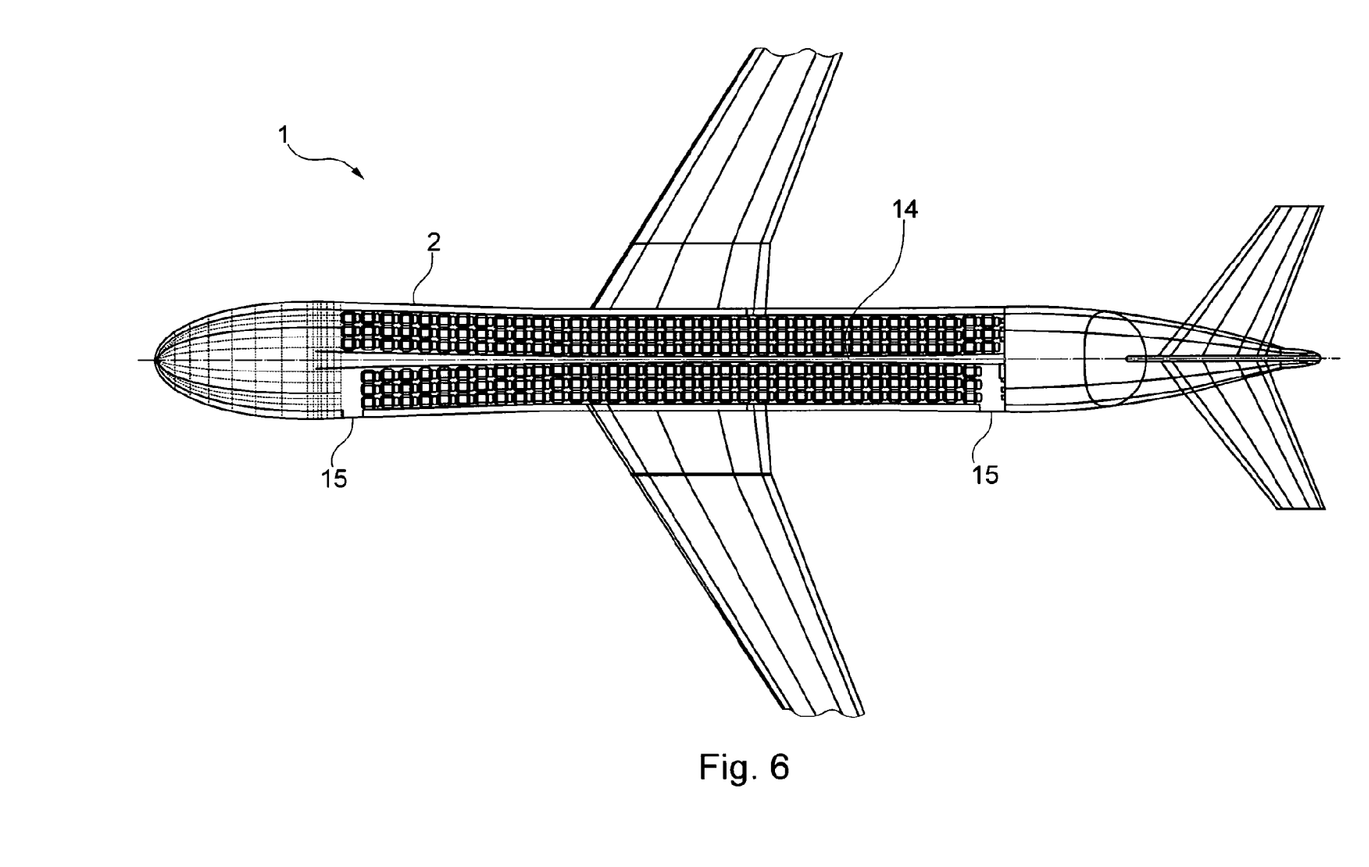
FIG. 6 shows a view of the passenger cabin of the aircraft shown in FIG. 4.
Figure 7:
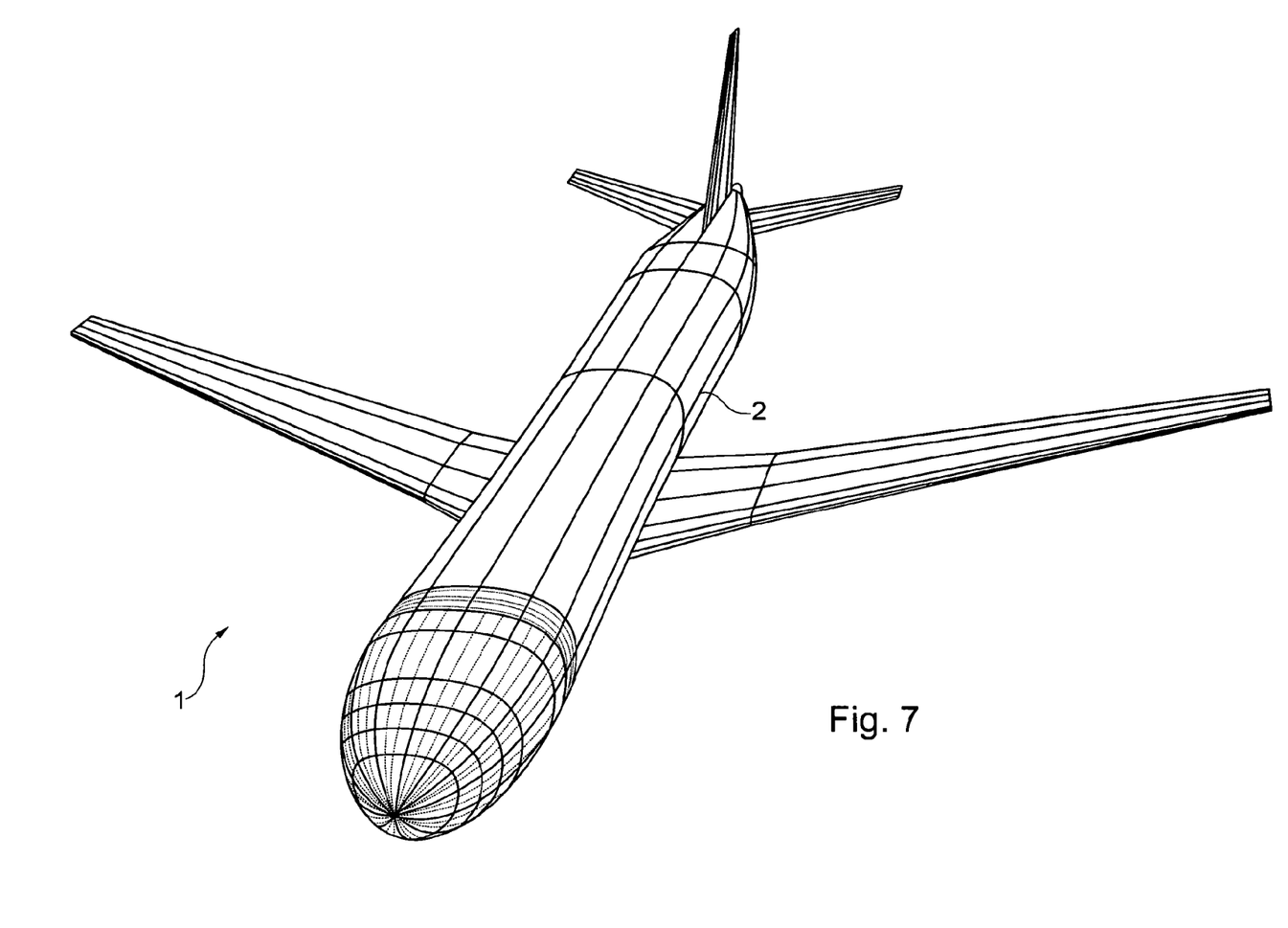
FIG. 7 shows a perspective view of the aircraft of FIG. 4.

FIGS. 5, 6 and 7 show an fuselage 2 or an aircraft 1 with a fuselage 2 whose two facing exterior skin regions 6, 7 are curved inwards so that the fuselage 2 in horizontal projection is biconcave in shape. Such a design with a waisted fuselage 2 can be advantageous in particular in the case of high-speed aircraft because in the high-speed range the laws of aerodynamics are virtually reversed.

Since in a fuselage 2 with a biconcave shape the aisle 14 widens towards the end regions of the fuselage, it is advantageous if in such a fuselage 2 two boarding doors 15 are provided, of which one is arranged in the rear region while the other is arranged in the nose region of the fuselage 2, as diagrammatically shown in FIG. 5.

Figure 8:
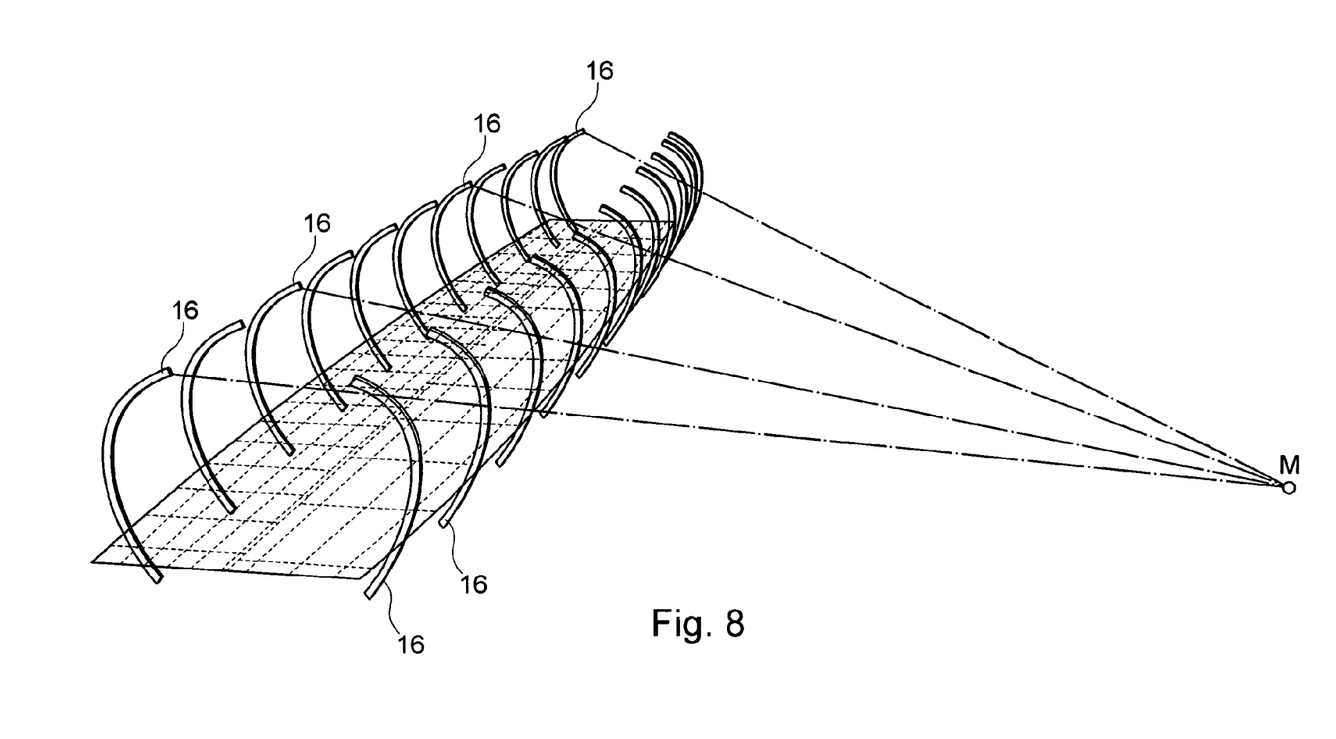
FIG. 8 shows the arrangement, according to the invention, of the lateral frames.

FIG. 8 shows a fuselage section according to the invention, in which the exterior skin regions 6, 7 are not shown. The diagram shows that the fuselage section comprises a multitude of identically dimensioned lateral fuselage frames 16, which in horizontal projection are arranged such that they point in the direction of a common centre point M of a circle, as correspondingly shown in the perspective view of FIG. 7. This shows that along the entire length of the fuselage section 2, lateral fuselage frames 16 of the same type can be used so that in contrast to the situation with a conventional fuselage it is not necessary to provide special fuselage frames for the conically tapering-off fuselage sections.

Figure 9:
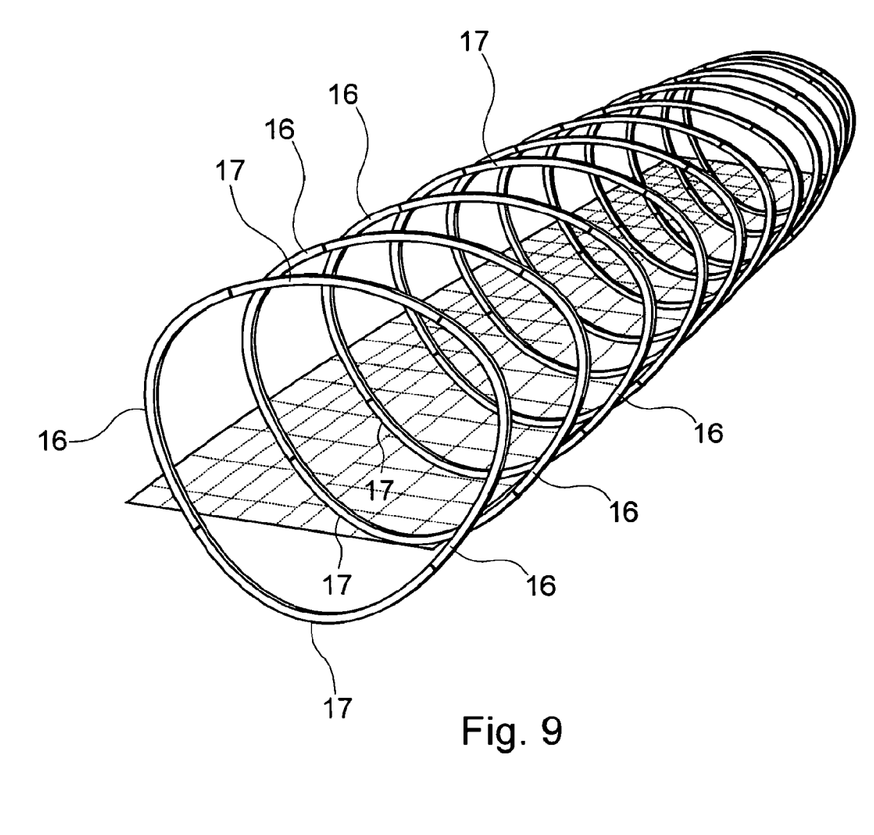
FIG. 9 corresponds to FIG. 7, wherein in addition transverse frames have been fitted.

As shown in FIG. 9, at their head ends and at their base ends the facing lateral fuselage frames 16 can be connected to transverse frames 17 so that a uniformly circumferential fuselage frame is created.

Figure 10:
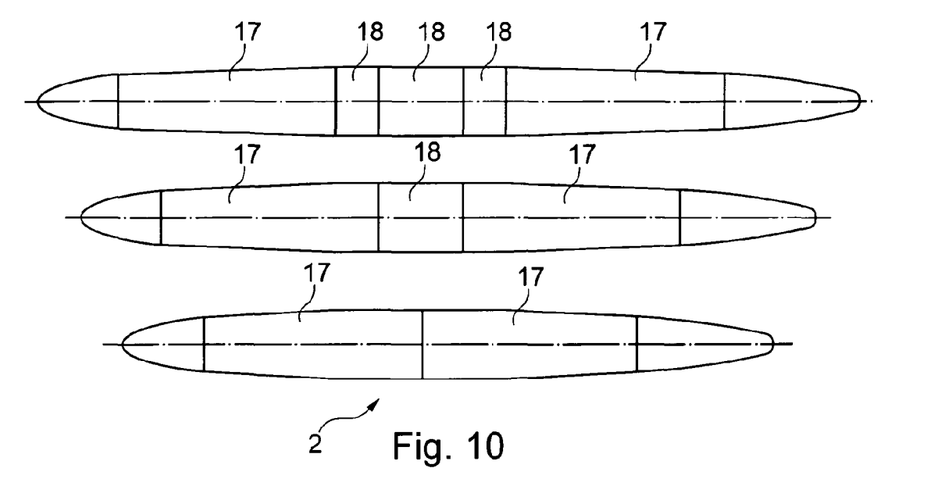
FIGS. 10 and 11 explain the installation of straight-line fuselage sections between two fuselage sections according to the invention.
Figure 11:
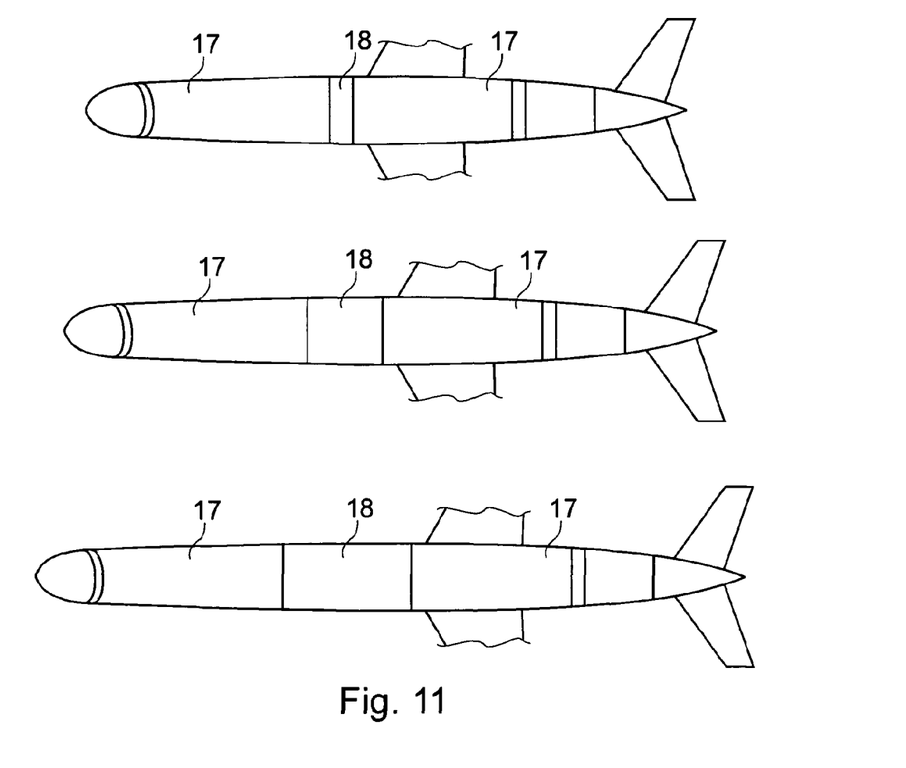

FIGS. 10 and 11 explain different embodiments of a fuselage according to the invention, which fuselage comprises two biconcave fuselage sections 17. In the lowermost diagram of FIG. 10 the two biconvex fuselage sections 17 are directly connected to each other at their wide ends. In contrast to this, the two biconvex fuselage sections 17 in the middle diagram of FIG. 10 are connected to each other by means of a straight-line fuselage section 18 which in the middle region of the entire fuselage 2 is inserted between these two fuselage sections 17. By means of such interposition of a straight-line fuselage section 18 the longitudinal extension of the fuselage 2 can be extended as required.

In order to achieve a still further increase in the longitudinal extension of the fuselage 2, in the uppermost diagram in FIG. 10 two further straight-line fuselage sections 18 on the right-hand side and on the left-hand side of the straight-line fuselage section 18 from the middle diagram of FIG. 9 have been inserted, as a result of which insertion the fuselage 2 is extended overall.

Instead of interposing several straight-line fuselage sections 18 of different widths between the two fuselage sections 17 according to the invention it is of course also possible to interpose only one straight-line fuselage section 18 between the two biconvex fuselage sections 17, as shown in FIG. 11, wherein, however, the individual straight-line fuselage sections 18 in the individual diagrams in FIG. 11 comprise different longitudinal extensions, so that, likewise, fuselages 2 of different lengths result.

Figure 12:
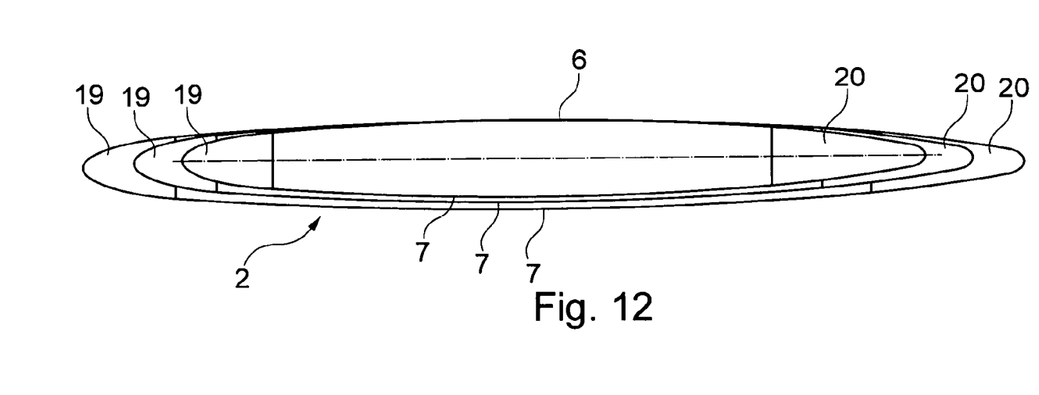
FIG. 12 shows three fuselages of different sizes, each fuselage comprising identical fuselage and nose designs.

As shown in FIG. 12, with the exterior skin segments 12 or the exterior skin regions 6, 7 formed by them, fuselages 2 of different sizes can be produced in that the exterior skin regions 6 or the exterior skin segments 12 comprise different curvatures. In this way one and the same fuselage- or nose components 19, 20 can be used for fuselages 2 that differ in size, as is shown in FIG. 11.

Figure 13:
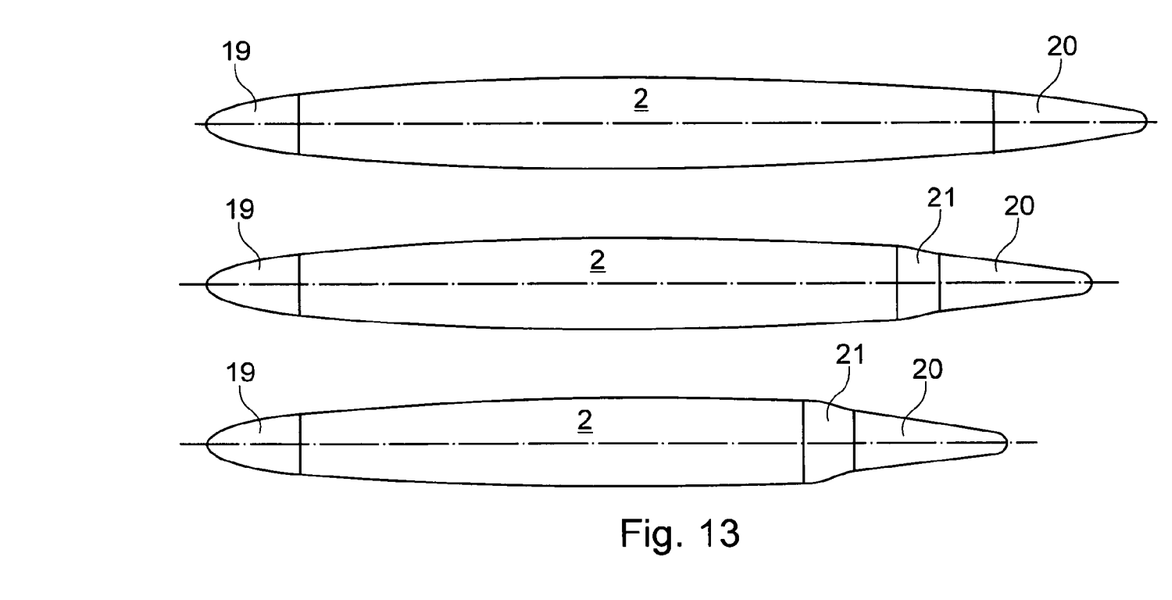
Figure 14:
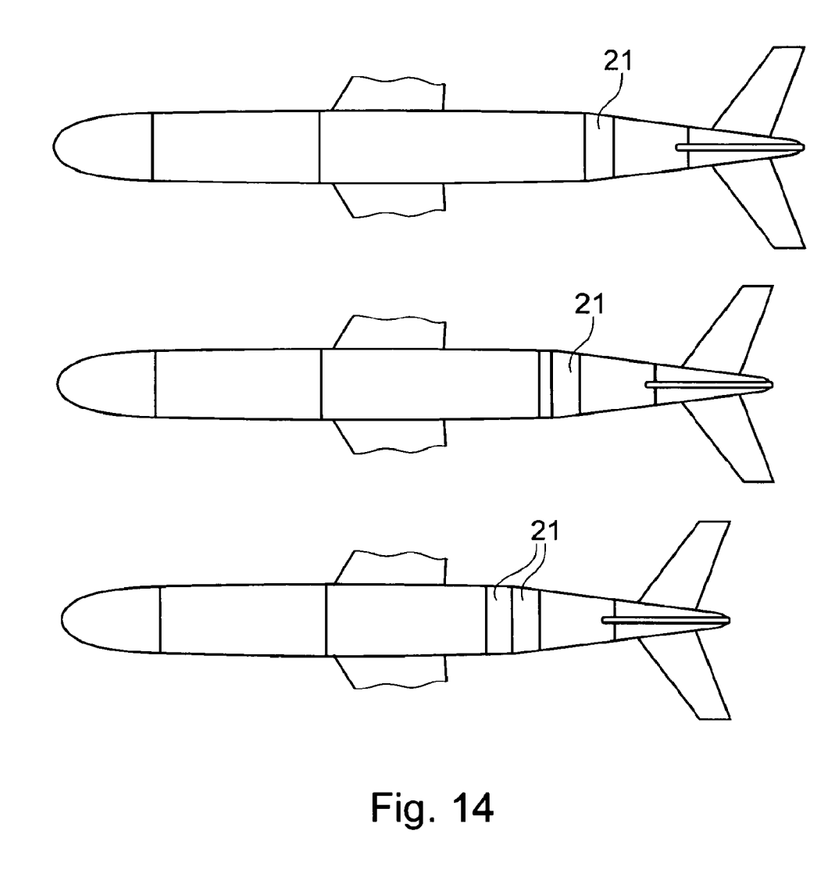

Identical fuselage- and nose components 19, 20 can also be used in the production of fuselages 2 that differ in size, in cases where the exterior skin segments 12 for fuselages of different sizes are not curved differently, provided that a tapering-off intermediate section 21 is interposed, for example between the fuselage section 17 and the fuselage part 20, as is shown in the two lower diagrams in FIG. 13 and in the diagrams in FIG. 14.

In addition, it should be pointed out that "comprising" does not exclude other elements or steps, and "a" or "one" does not exclude a multitude. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

REFERENCE CHARACTERS

1 Aircraft
2 Fuselage
3 Nose region
4 Rear region
5 Airfoil
6 First or left-hand exterior skin region
7 Second or right-hand exterior skin region
8 Interior lining
9 Interior lining segment
10 Ceiling lining
11 Lateral lining
12 Exterior skin segment
13 Interior lining segment
14 Aisle
15 Boarding door
16 Lateral fuselage frame
17 Fuselage section
18 Straight-line fuselage section
19 Nose region
20 Fuselage region
21 Intermediate section
22 Seat row

The invention claimed is:

1. A fuselage section comprising an interior that forms a passenger cabin comprising an interior lining that spans the longitudinal length of the fuselage and which in horizontal projection is geometrically defined by a first exterior skin region and a second exterior skin region, which second exterior skin region faces the first exterior skin region, wherein the two exterior skin regions in longitudinal direction of the passenger cabin comprise a circular-arc-shaped contour of uniform curvature,
wherein the interior lining lines at least one of the two facing exterior skin regions,
wherein the interior lining in horizontal projection in longitudinal direction of the fuselage comprises a circular arc shape of uniform curvature, and
wherein the interior lining is comprised of a plurality of interior lining segments that are designed for using one and the same interior lining segment alternatively for lining the first exterior skin region or the second exterior skin region.

2. The fuselage section of claim 1, wherein each of the two exterior skin regions comprises a plurality of exterior skin segments which in horizontal projection comprise a circular-arc-shaped exterior contour, and wherein the exterior contour of the exterior skin segments coincides with the contour of the fuselage section.

3. The fuselage section of claim 1, wherein the two facing exterior skin regions are curved such that in horizontal projection the fuselage section comprises a biconvex shape at least in some regions.

4. The fuselage section of claim 1, wherein the two facing exterior skin regions are curved such that in horizontal projection the fuselage section comprises a biconcave shape at least in some regions.

5. The fuselage section of claim 1, wherein the interior lining comprises a plurality of interior lining segments which in horizontal projection are in the shape of a circular arc, wherein the curvature of the interior lining segments corresponds to the curvature of the contour of the fuselage section.

6. The fuselage section of claim 5, wherein the interior lining segments comprise components from the group comprising lateral lining, base lining, illumination strip, service panel lining, hatrack and ceiling lining.

7. The fuselage section of claim 1, further comprising:
a plurality of stringers which in horizontal projection are shaped in the manner of a circular arc,
wherein the curvature of the stringers is uniform, which curvature corresponds to the contour of the exterior skin regions.

8. The fuselage section of claim 1, further comprising:
a plurality of lateral fuselage frames of identical dimensions, which lateral fuselage frames in horizontal projection are arranged such that they point in the direction of a common centre of a circle.

9. An interior lining for lining an aircraft passenger cabin, the lining comprising, in horizontal projection a geometrically defined first interior lining region and a second interior lining region that faces said first interior lining region, wherein in longitudinal direction of the aircraft passenger cabin the two interior lining regions comprise a circular arc shape of uniform curvature;
wherein the interior lining regions comprise a plurality of interior lining segments which in horizontal projection comprise a circular arc shape,
wherein the curvature of the interior lining segments corresponds to the curvature of the shape of the interior lining regions;
wherein the interior lining segments are designed to be used alternatively for lining a left-hand exterior skin region or a right-hand exterior skin region of an aircraft.

10. The interior lining of claim 9, wherein the two facing interior lining regions are curved such that the aircraft passenger cabin in horizontal projection comprises a biconvex shape at least in some regions.

11. The interior lining of claim 9, wherein the two facing interior lining regions are curved such that the aircraft passenger cabin in horizontal projection comprises a biconcave shape at least in some regions.

12. The interior lining of claim 9, wherein the interior lining segments comprise components from the group comprising lateral lining, base lining, illumination strip, service panel lining, hatrack and ceiling lining.

13. A fuselage, which at least in some regions is formed by at least one fuselage section comprising an interior that forms a passenger cabin comprising an interior lining that spans the longitudinal length of the fuselage and which in horizontal projection is geometrically defined by a first exterior skin region and a second exterior skin region, which second exterior skin region faces the first exterior skin region, wherein the two exterior skin regions in longitudinal direction of the passenger cabin comprise a circular-arc-shaped contour of uniform curvature,
wherein the interior lining lines at least one of the two facing exterior skin regions.

14. The fuselage of claim 13,
wherein the at least one fuselage section comprises two fuselage sections, which two fuselage sections in longitudinal direction of the fuselage are arranged so as to be offset in relation to each other and are connected to each other by a straight-line fuselage section.

* * * * *